(12) United States Patent
Nakamura et al.

(10) Patent No.: US 7,841,725 B2
(45) Date of Patent: Nov. 30, 2010

(54) IMAGE DISPLAY DEVICE AND PROJECTOR

(75) Inventors: Junichi Nakamura, Shiojiri (JP);
Takashi Nitta, Chino (JP); Shoichi Uchiyama, Shimo-Suwa-Machi (JP);
Tsunemori Asahi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 696 days.

(21) Appl. No.: 11/552,805

(22) Filed: Oct. 25, 2006

(65) Prior Publication Data

US 2007/0103644 A1 May 10, 2007

(30) Foreign Application Priority Data

Nov. 9, 2005 (JP) ............................. 2005-324580

(51) Int. Cl.
*G03B 21/14* (2006.01)
*H04N 5/74* (2006.01)

(52) U.S. Cl. ........................................ 353/88; 348/758

(58) Field of Classification Search .................. 353/88, 353/89, 90, 94, 81, 82, 20, 27, 34, 31, 33; 348/758; 349/5, 7, 8, 9; 359/237, 634, 639, 359/640
See application file for complete search history.

(56) References Cited

U.S. PATENT DOCUMENTS

| | | | | |
|---|---|---|---|---|
| 4,541,691 | A * | 9/1985 | Buzak | 349/75 |
| 7,175,279 | B2 * | 2/2007 | Drazic et al. | 353/31 |
| 7,192,139 | B2 * | 3/2007 | Drazic et al. | 353/8 |
| 7,224,335 | B2 * | 5/2007 | Gibbon et al. | 345/84 |
| 7,317,578 | B2 * | 1/2008 | Drazic et al. | 359/637 |
| 7,431,460 | B2 * | 10/2008 | Hall et al. | 353/30 |
| 2004/0212895 | A1 * | 10/2004 | Pate | 359/634 |
| 2004/0257666 | A1 * | 12/2004 | Komatsu et al. | 359/649 |
| 2005/0168699 | A1 * | 8/2005 | Suzuki et al. | 353/31 |
| 2005/0174495 | A1 * | 8/2005 | Itoh et al. | 348/758 |
| 2005/0212786 | A1 * | 9/2005 | Nitta et al. | 345/204 |

FOREIGN PATENT DOCUMENTS

| | | |
|---|---|---|
| JP | A 6-167690 | 6/1994 |
| JP | A 2001-100689 | 4/2001 |
| JP | 2004-523001 | 7/2004 |
| WO | WO 02/069030 A2 | 9/2002 |
| WO | WO 2004051363 A2 * | 6/2004 |

* cited by examiner

*Primary Examiner*—William C Dowling
*Assistant Examiner*—Ryan Howard
(74) *Attorney, Agent, or Firm*—Oliff & Berridge, PLC (57) ABSTRACT

An image display device includes a first optical modulator that modulates a plurality of color lights coming from a light source, a color combination member that combines the color lights, a second optical modulator that modulates a light provided by the color combination member as a result of the color light combination, and a relay optical system that is disposed between the color combination member and the second optical modulator. The replay optical system guides the light provided by the color combination member to the second optical modulator. A light transmissive member is disposed between the relay optical system and the second optical modulator, and allows optical path conditions from the first optical modulator to the relay optical system via the color combination member to be substantially the same as optical path conditions from the relay optical system to the second optical modulator.

16 Claims, 6 Drawing Sheets

IMAGE DISPLAY DEVICE AND PROJECTOR

BACKGROUND

1. Technical Field

The present invention relates to an image display device and a projector.

2. Related Art

The image quality has been recently improved remarkably in electronic display devices, e.g., LCDs (Liquid Crystal Displays), EL (Electro-luminescence) displays, plasma displays, CRTs (Cathode Ray Tubes), and projectors. Some devices are about to achieve the performance capabilities about as good as human visual characteristics specifically in terms of resolution and color range. As to a brightness dynamic range, however, the reproduction range is of about 1 to 102 [nit], and the number of tones is generally 8 bits. On the other hand, the human vision covers the range of about 10-2 to 104 [nit] for the brightness dynamic range perceivable at a time, and in terms of brightness discrimination capabilities, covers the range of 0.2 [nit], which is corresponding to about 12 bits if converted into the number of tones. If users having such visual characteristics look at display images on currently-available display devices, they may feel something is missing, i.e., display images are not close to reality enough, and lacking visual impact. This is caused because the users easily notice the narrow brightness dynamic range and the lacking of tones in portions of shadow and highlight.

With CG (Computer Graphics) for use in movies, games, and others, pursuing reality for graphical representation has been becoming mainstream by providing display data (hereinafter, referred to as HDR (High Dynamic Range) display data) with brightness dynamic range and tone characteristics both close to those of human vision. The problem for such pursuit is that the currently-available display devices are not capable enough to display the resulting CG contents, and thus the CG contents cannot be displayed expressive enough as they are supposed to.

Another issue here is that the next OS (Operating System) is planning to take the 16-bit color space, and compared with the current 8-bit color space, the dynamic range and the number of tones are expected to be dramatically increased. This thus may lead to more demands for electronic display devices with wider dynamic range and larger number of tones to make full use of the 16-bit color space.

Some display devices, i.e., projection-type display devices (projectors) such as liquid crystal projectors, DLP™ (Digital Light Processing) projectors are capable of large-screen display, and serve effective to reproduce the display images with reality and impact. In the field of display devices, the following proposals are made to solve the above-described problems.

Patent Documents 1 to 3 (JP-A-2001-100689, JP-T-2004-523001, and JP-A-6-167690) describe the basic configuration for widening the brightness dynamic range in projectors. That is, a luminous flux ejected from a light source is separated into color lights of red, green, and blue, and the resulting color lights are each modulated by a first optical modulator so that any desired illumination distribution is formed. After modulation as such, the resulting color lights are combined by a dichroic prism and then transmitted to a second optical modulator by a relay optical system for brightness adjustment thereby before illumination. The first and second optical modulators are often of the same dimension, and there thus needs to set the relay optical system by the magnification of 1.

In such a configuration, a light-transmissive modulator is used as the optical modulator, a typical example of which is a liquid crystal light valve. The light-transmissive modulator is of the pixel structure or the segment structure in which the transmittance can be independently controlled, and control can be exercised over a two-dimensional transmittance distribution. As an alternative to such a light-transmissive modulator, a reflection modulator is a possible option, a typical example of which is a DMD (Digital Micromirror Device).

Considered here is a case of using an optical modulator having the transmittance of 0.2% for dark display, and the transmittance of 60% for bright display. If with a piece of optical modulator, the brightness dynamic range is 60/0.2=300. With the above-described display device, the brightness dynamic range is equivalent to 300 pieces of optical modulators arranged optically in series. It thus means, theoretically, that the brightness dynamic range of 300×300=90000 is realized. This is similarly applicable to the number of tones, and by arranging 8-bit-tone optical modulators optically in series, the resulting number of tones can exceed 8 bits.

Note here that the first and second optical modulators are separately driven by a modulation signal derived from a video signal.

The problem with the projectors described in Patent Documents 1 to 3 is that, however, on the optical path with the relay optical system disposed in the middle, only one side thereof carries thereon a dichroic prism. Due to the dichroic prism disposed as such, the distance from the relay optical system to the first optical modulator is not the same as the distance from the relay optical system to the second modulator system. As such, the optical path conditions are not the same between the sides of the relay optical system, thereby causing a difficulty in designing the relay optical system and resulting in the considerable increase of cost.

The design difficulty easily results in problems of chromatic aberration highly visible in the relay optical system, the lower image-forming performance capabilities, and others. These problems get in the way of increasing the contrast of displaying image, increasing the dynamic range, and the like.

SUMMARY

An advantage of some aspects of the invention is to provide an image display device and a projector that are both capable of contributing to reduce the cost, and increase the contrast and dynamic range of displaying images.

A first aspect of the invention is directed to an image display device that includes: a light source; a first optical modulator that modulates a plurality of color lights coming from the light source; a color combination member that combines the color lights provided by the first optical modulator; a second optical modulator that modulates a light provided by the color combination member as a result of the color light combination; a relay optical system that is disposed between the color combination member and the second optical modulator, and guides the light provided by the color combination member to the second optical modulator; and a light transmissive member that is disposed between the relay optical system and the second optical modulator, and has a function of allowing optical path conditions from the first optical modulator to the relay optical system via the color combination member to be substantially the same as optical path conditions from the relay optical system to the second optical modulator.

In the first aspect, the light transmissive member for passing therethrough the light from the relay optical system is disposed between the relay optical system and the second optical modulator so as to allow the optical path conditions from the first optical modulator to the relay optical system to be substantially the same as the optical path conditions from the relay optical system to the second optical modulator. As such, the optical path conditions can be substantially the same between the sides of the relay optical system so that the designing of the relay optical system can be made with ease. This favorably reduces the cost taken to design the relay optical system. What is more, the easier design procedure hardly causes problems of highly-visible chromatic aberration, the lower image-forming performance capabilities, and others so that the relay optical system can be increased in performance capability. With better performance capabilities as such, the image display device becomes able to contribute to increase the contrast and dynamic range of displaying images.

The light coming from the light source is displayed as images after going through, on a predetermined optical path, the optical components, i.e., a color separation unit, the first optical modulator, the color combination member, the relay optical system, the second optical modulator, and others. In this process, the light is lost while passing through such optical components, or the light is dispersed among the optical components, for example. The "optical path conditions" denote the conditions for the length of the optical path and the amount of dispersed light in a predetermined segment. In a case where the light proceeds by a distance d in the space of the refractive index of n, the length of optical path is n/d. The light dispersion varies in degree in the air and in the glass, for example.

In the first aspect, preferably, the light transmissive member is made of the same material as the color combination member, and the light transmissive member is a light transmissive prism whose dimension in an optical axis direction is substantially the same as the dimension of the color combination member in the optical axis direction.

In the configuration, the light transmissive member, i.e., light transmissive prism, is made of the same material as the color combination member, and the light transmissive member has substantially the same dimension in the optical axis direction as the color combination member in the optical axis direction. Therefore, not only the refractive index, the light transmissive prism can also share the same optical path conditions with the color combination member so that the optical path conditions can be the same between the sides of the relay optical system.

In the first aspect, still preferably, the light transmissive member is provided with a reflector surface that reflects the light from the relay optical system.

In the configuration, the light transmissive member is provided with the reflector surface that reflects the light from the relay optical system so that the optical path of the light can be bent. This favorably makes the relay optical system compact in size, and the image display device can be accordingly reduced in size. The reflector surface may be formed inside of the above-described light transmissive prism, e.g., at the position overlapping the diagonal line when viewed from the above, or on the surface of the light transmissive member, e.g., hypotenuse of a triangular prism with the isosceles-triangle-shaped bottom surface.

In the first aspect, still preferably, the distance from the color combination member to the relay optical system is made substantially the same as the distance from the relay optical system to the light transmissive member.

In the configuration, the distance from the color combination member to the relay optical system is substantially the same as the distance from the relay optical system to the light transmissive member. This allows the optical path conditions from the relay optical system to the first optical modulator to be substantially the same as the optical path conditions from the relay optical system to the second optical modulator so that the optical path conditions can be symmetric with respect to the relay optical system. Such symmetry greatly facilitates the designing of the relay optical system to a considerable degree.

In the first aspect, still preferably, the light transmissive member is provided with a polarizer plate.

If the first and second optical modulators are both a liquid crystal device, an optical member such as polarizer plate is required to polarize the light in a predetermined direction. In the configuration, however, the light transmissive member is provided with the polarizer plate so that there is no more specific need to separately provide the polarizer plate, and the image display device can be saved in space thereby. What is more, the polarizer plate absorbs the light, and the light generates heat which is absorbed by the light transmissive member so that the polarizer can be increased in heat dissipation.

In the first aspect, still preferably, the light transmissive member is provided with an optical filter that reduces the bandwidth of the light.

In the configuration, the optical filter is provided to reduce the bandwidth of the light so that the color light can be adjusted in brightness thereby. For example, when the color light is adjusted to reduce the brightness, the color light is increased in color purity compared with the case of uniformly reducing the brightness in the entire wavelength so that the color area is advantageously increased. Herein, because the optical filter is provided to the light transmissive member, there is no more need to separately include the optical filter so that the image display device can be saved in space. As a result, the image display device can be favorably reduced in size.

In the first aspect, still preferably, the light transmissive member is provided with a polarizer separation section.

In the configuration, the optical path conditions between the first optical modulator and the relay optical system can be made substantially the same as the optical path conditions between the second optical modulator and the relay optical system, and the second optical modulator can serve as a light incident-side polarizer plate. If a beam splitter is used as the polarizer separation section, for example, the projection image will be brighter than with a normal polarizer plate because the beam splitter is high in light transmission efficiency compared with the polarizer. The heat dissipation can be also increased against the heat generation as a result of light absorption.

In the first aspect, still preferably, the light transmissive member is provided with a wave plate.

In the configuration, the light transmissive member is provided with the wave plate. There is thus no more need to separately include the wave plate so that the image display device can be saved in space. As a result, the image display device can be favorably reduced in size.

A second aspect of the invention is directed to a projector that includes the image display device of any one of the image display devices those described above.

In the second aspect, because the image display device is capable of contributing to reduce the cost, and increase the contract and the dynamic range of displaying images, the resulting projector can include a display section that can be manufactured with low cost and with good display characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention is described by referring to the accompanying drawings.

Figure 1:
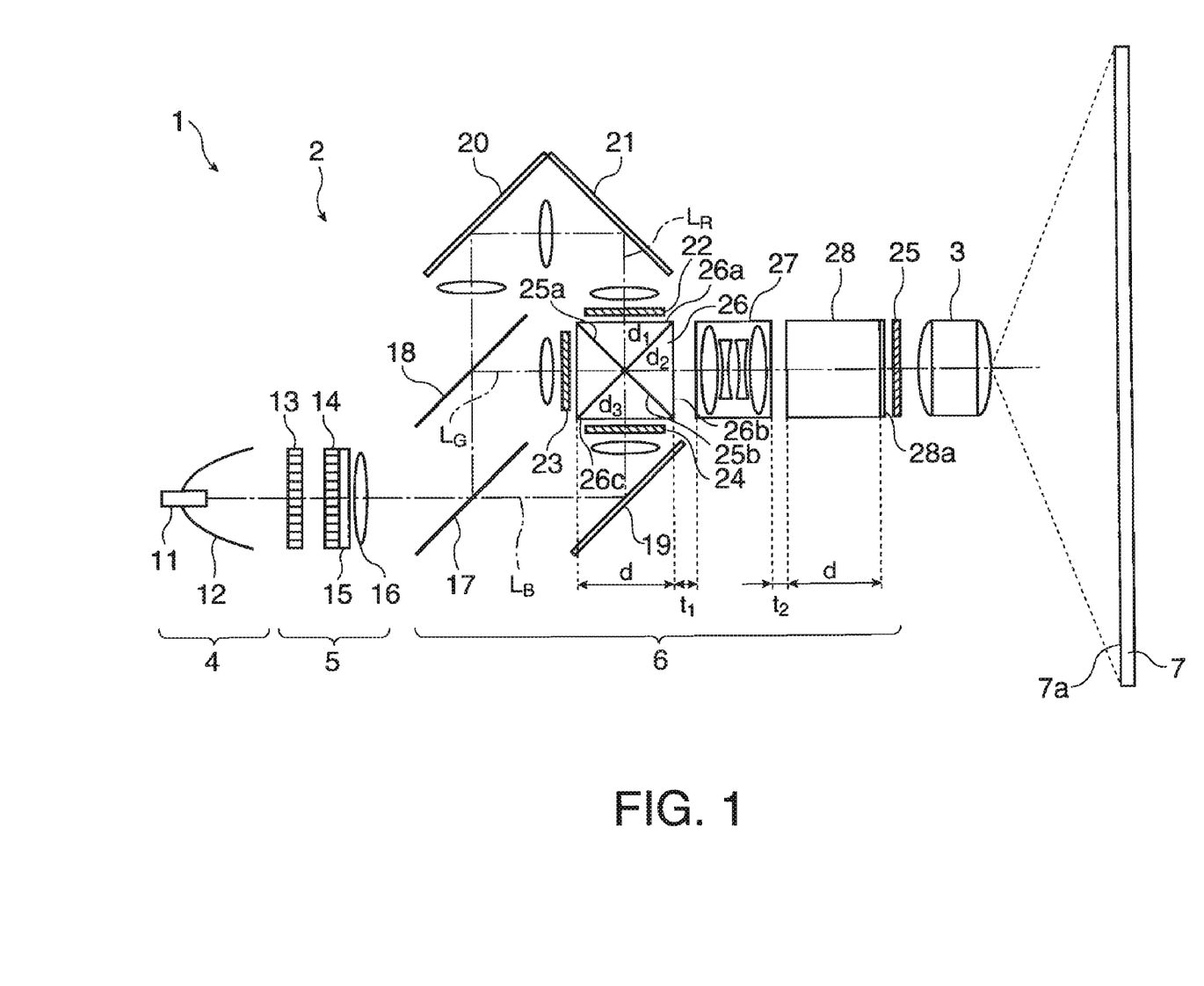
FIG. 1 is a diagram showing the configuration of a projector in a first embodiment of the invention.

FIG. 1 is a schematic diagram showing the internal configuration of a projector 1 serving as a projector.

The projector 1 is a three-panel color liquid crystal projector that includes a light-transmissive liquid crystal light valve each for colors of R (red), G (green), and B (blue) for example. The projector is mainly configured by an image display device 2, and a projection lens 3.

The image display device 2 includes, broadly, a light source section 4, a uniform illumination section 5, and a color modulation section 6.

The light source section 4 is mainly configured by a lamp 11, and a reflector 12. The lamp 11 is a light source for the image display device 2, and by extension, for the projector 1. The lamp 11 is exemplified by a high-pressure mercury lamp or others that eject white lights, for example. The reflector 12 is a reflector member that reflects the white lights, and is so provided that the white lights from the lamp 11 are directed substantially orthogonal direction to a projection surface 7a of a screen 7.

The uniform illumination section 5 is mainly configured by fly's eye lenses 13 and 14, a polarization conversion element 15, and a light gathering lens 16. The fly's eye lens 13 forms a plurality of secondary light source images. The light gathering lens 16 overlays the secondary light source images formed by the fly's eye lens 13.

The color modulation section 6 is mainly configured by dichroic mirrors 17 and 18, reflector mirrors 19, 20, and 21, liquid crystal light valves 22, 23, 24, and 25, a dichroic prism 26, a relay optical system 27, and a light transmissive prism 28.

The dichroic mirrors (color separation means) 17 and 18 serve as a color separation unit that separates a light coming from a light source into a plurality of color lights. Out of the white lights coming from the lamp 11, the dichroic mirror 17 passes therethrough a blue light $L_B$, and reflects a red light $L_R$ and a green light $L_G$. The dichroic mirror 18 reflects the green light $L_G$, and passes therethrough the red light $L_R$.

The reflector mirror 19 reflects the blue light $L_B$ toward the side of the dichroic prism 26. The reflector mirrors 20 and 21 each reflect the red light $L_R$ in the direction of 90 degrees, and guide the light to the dichroic prism 26.

The liquid crystal light valve 22 is a color modulation light valve that modulates the red color $L_R$ into an image light based on a color signal. The liquid crystal light valve 23 is another color modulation light valve that modulates the green color $L_G$ into an image light based on a color signal. The liquid crystal light valve 24 is still another color modulation light valve that modulates the blue color $L_B$ into an image light based on a color signal. The liquid crystal light valve 25 is a brightness modulation light valve that modulates the brightness of a light as a result of combining the red light $L_R$, the green light $L_G$, and the blue light $L_B$ based on a brightness signal. In the following description, the liquid crystal light valves 22 to 24 (first optical modulators are sometimes referred to as color modulation light valves 22 to 24, and the liquid crystal light valve 25 (second optical modulator) as brightness modulation light valve 25.

The liquid crystal valves 22, 23, 24, and 25 are all of the same dimension, e.g., about 4.6 square centimeters (about 0.7 square inches), and are each configured by a liquid crystal device formed with pixels in matrix. The liquid crystal light valves 22, 23, 24, and 25 share the same number of pixels, pixel arrangement, and pixel pitch.

The dichroic prism (color combination member) 26 is a cubic optical member configured by four right-angle prisms attached together. The right-angle prisms are each made of a transparent material exemplified by glass, resin, or the like. Inside of the dichroic prism 26, dielectric multilayers 25a and 25b are formed in the shape of a cross to orthogonally intersect each other at the center of the dichroic prism 26. The dielectric multilayer 25a reflects the red light $L_R$, and the dielectric multilayer 25b reflects the blue light $L_B$. These dielectric multilayers 25a and 25b each pass therethrough the green light $L_G$, and combine three color lights so that a light representing a color image, i.e., video light, is formed.

The red light $L_R$ passing through the dichroic prism 26 has the optical path whose length is the sum of lengths $d_1$ and $d_2$. The length $d_1$ is from a light incident-side surface 26a to the dielectric multilayer 25a, and the length $d_2$ is from the dielectric multilayer 25a to a light exiting-side surface 26b. Similarly, the blue light $L_B$ passing through the dichroic prism 26 has the optical path whose length is the sum of lengths $d_3$ and $d_2$. The length $d_3$ is from a light incident-side surface 26c to the dielectric multilayer 25b, and the length $d_2$ is from the dielectric multilayer 25b to the light incident-side surface 26b.

As described above, dielectric multilayers 25a and 25b are substantially orthogonally intersecting each other at the center of the dichroic prism 26. Therefore, the sum of the length $d_1$ from the light incident-side surface 26a to the dielectric multilayer 25a and the length $d_2$ from the dielectric multilayer 25a to a light exiting-side surface 26b, and the sum of the length $d_3$ from the light incident-side surface 26c to the dielectric multilayer 25b and the length $d_2$ from the dielectric multilayer 25b to the light exiting-side surface 26b are both the same as a length d of one side of the dichroic prism 26. The green light $L_G$ passing through the dichroic prism 26 has the optical path length of d as is passing through the dichroic prism 26.

The relay optical system 27 is an optical system that guides a light as a result of combination by the dichroic prism 26, and is disposed between the dichroic prism 26 and the liquid crystal light valve 25. The relay optical system 27 is disposed with a space $t_1$ from the dichroic prism 26.

Figure 2:
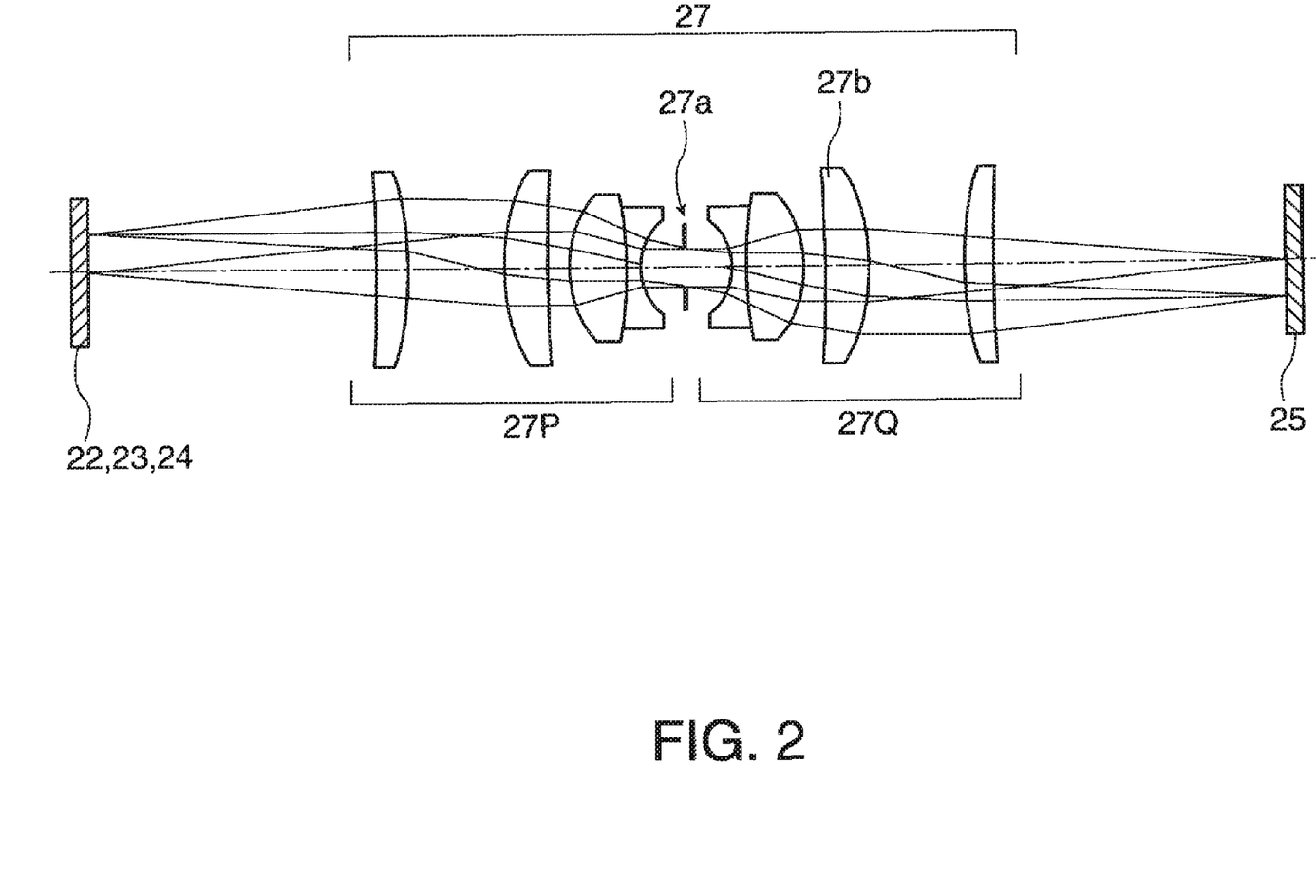
FIG. 2 is a diagram showing the configuration of a relay optical system of the projector in the first embodiment.

FIG. 2 is a schematic diagram showing the configuration of the relay optical system 27. For convenience of description, FIG. 2 does not show the dichroic prism 26 and the light transmissive prism 28.

As shown in FIG. 2, the relay optical system 27 has the configuration including a plurality of lenses 27b to a preceding stage (color modulation light valve side) 27P and a subsequent stage (brightness modulation light valve side) 27Q with an aperture section 27a disposed therebetween. The lenses 27b are combined together to be telecentric among the color modulation light valves 22, 23, and 24 and the relay optical system 27, and between the brightness modulation light valve 25 and the relay optical system 27, i.e., for the relay optical system 27 to be characteristically telecentric on both sides.

Referring back to FIG. 1, the dimension (length) d of the light transmissive prism 28 in the optical axis direction is the same as the dimension (length) d of the dichroic prism 26 in the optical axis direction. The light transmissive prism 28 passes therethrough the combined light guided by the relay optical system 27. The light transmissive prism 28 is made of a material same as the dichroic prism 26, e.g., transparent material such as glass or resin. Accordingly, the dichroic prism 26 and the light transmissive prism 28 share the same refractive index and optical path length therein. The light transmissive prism 28 is disposed with a space $t_2$ from the relay optical system. The space $t_2$ is equal to the space $t_1$. The light transmissive prism 28 is attached with a polarizer plate 28a on the light-incident surface side of the brightness modulation light valve 25, for example.

The projection lens 3 projects the video light toward the screen 7.

The light coming from the lamp 11 is converted into a collimated light (linear polarized light), and the resulting collimated light is modulated by the liquid crystal light valves 22, 23, 24, and 25. The modulated color lights are then projected onto the screen 7 by the projection lens 3.

Described next is image processing by the liquid crystal light valves 22, 23, 24, and 25 of this embodiment. Images for projection on the screen 7 are generated by modulation in the liquid crystal light valves 22, 23, 24, and 25 on a pixel basis. An image processing device 30 described below is provided for exercising control over the modulation on a pixel basis.

Figure 3:
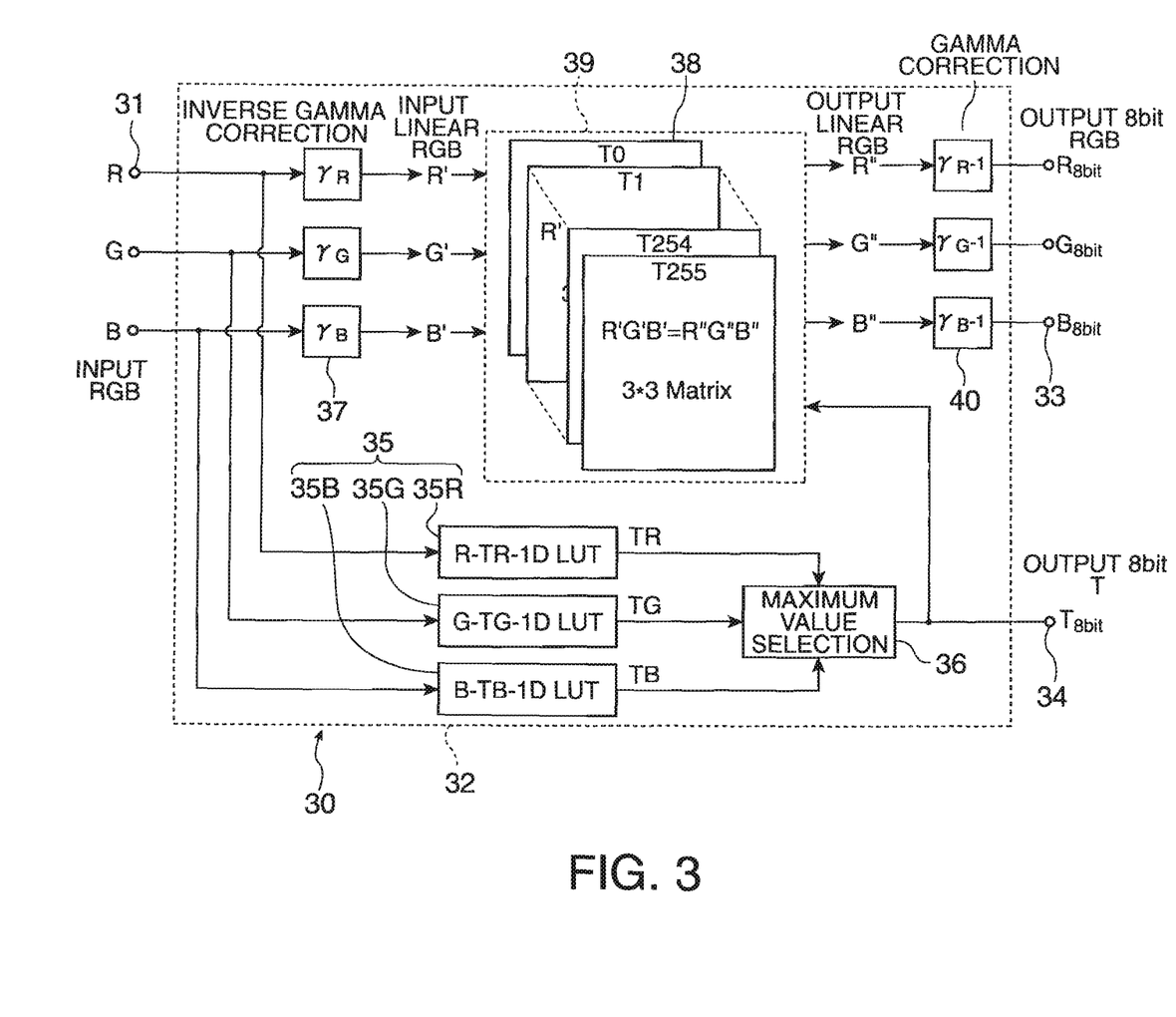
FIG. 3 is a diagram showing the configuration of a control system of the projector in the first embodiment.

As shown in FIG. 3, the image processing device 30 is configured to include an input section 31, a signal processing section 32, a color control signal output section 33, and a brightness control signal output section 34. In the image processing device 30 of this embodiment, the input section 31 receives RGB image input signals of R, G, and B, and the signal processing section 32 processes these input signals. The color control signal output section 33 outputs 8-bit color control signals of R8bit, G8bit, and B8bit, and the brightness control signal output section 34 outputs an 8-bit brightness control signal (T8bit). The color control signals of R8bit, G8bit, and B8bit are signals for controlling the color modulation light valves 22, 23, and 24, and the brightness control signal T8bit is a signal for controlling the brightness modulation light valve 25.

The signal processing section 32 is configured to include a table 35, a maximum value calculation/selection section 36, an inverse γ correction section 37, a matrix storage section 38, a matrix computation/selection section 39, and a γ correction section 40.

The table 35 is provided in advance with values of R-TR-1DLUT, G-TG-1DLUT, and B-TB-1DLUT for the incoming signals of R, G, and B corresponding to the brightness control signal $T_{8bit}$. In this example, the table provided with the value R-TR-1DLUT is referred to as table 35R, the table provided with the value G-TG-1DLUT is referred to as table 35G, and the table provided with the value B-TB-1DLUT is referred to as table 35B.

The maximum value calculation/selection section 36 calculates values of $T_R$, $T_G$, and $T_B$, and selects the maximum value therefrom. The value $T_R$ is derived by subtracting the value R-TR-1DLUT in the table 35R from the input value of R, the value $T_G$ is derived by subtracting the value G-TG-1DLUT in the table 35G from the input value G, and the value $T_B$ is derived by subtracting the value B-TB-1DLUT in the table 35B from the input value B. Thereafter, the selected maximum value is output to the brightness control signal output section 34 as the brightness control signal $T_{8bit}$. The value of this brightness control signal $T_{8bit}$ is set in 256 levels based on the brightness, e.g., the value is $T_0$ with the brightness being zero, and is $T_{255}$ with the brightness being the maximum.

The inverse γ correction section 37 subjects the input signals of R, C, and B to inverse γ correction to convert these signals to input linear signals of R', G', and B'.

The matrix storage section 38 stores therein a 3-by-3 matrix for converting the input linear signals of R', G', and B' to output linear signals of R", G", and B" for every value of the brightness control signal $T_{8bit}$, i.e., for each of 256 values of the brightness control signal $T_{8bit}$ from $T_0$ (brightness being zero) to $T_{255}$ (brightness being the maximum).

The matrix computation/selection section 39 selects the 3-by-3 matrix corresponding to the brightness control signal $T_{8bit}$ from the matrix storage section 38. The output linear signals of R", G", and B" are calculated by multiplying the input linear signals of R', G', and B' by the selected 3-by-3 matrix.

The γ correction section 40 subjects the output linear signals R", G", and B" to γ correction to convert these signals to output 8-bit signals of $R_{8bit}$, $G_{8bit}$, and $B_{8bit}$. These resulting output 8-bit signals of $R_{8bit}$, $G_{8bit}$, and $B_{8bit}$ are output to the color control signal output section 33 as the color control signals.

Figure 4:
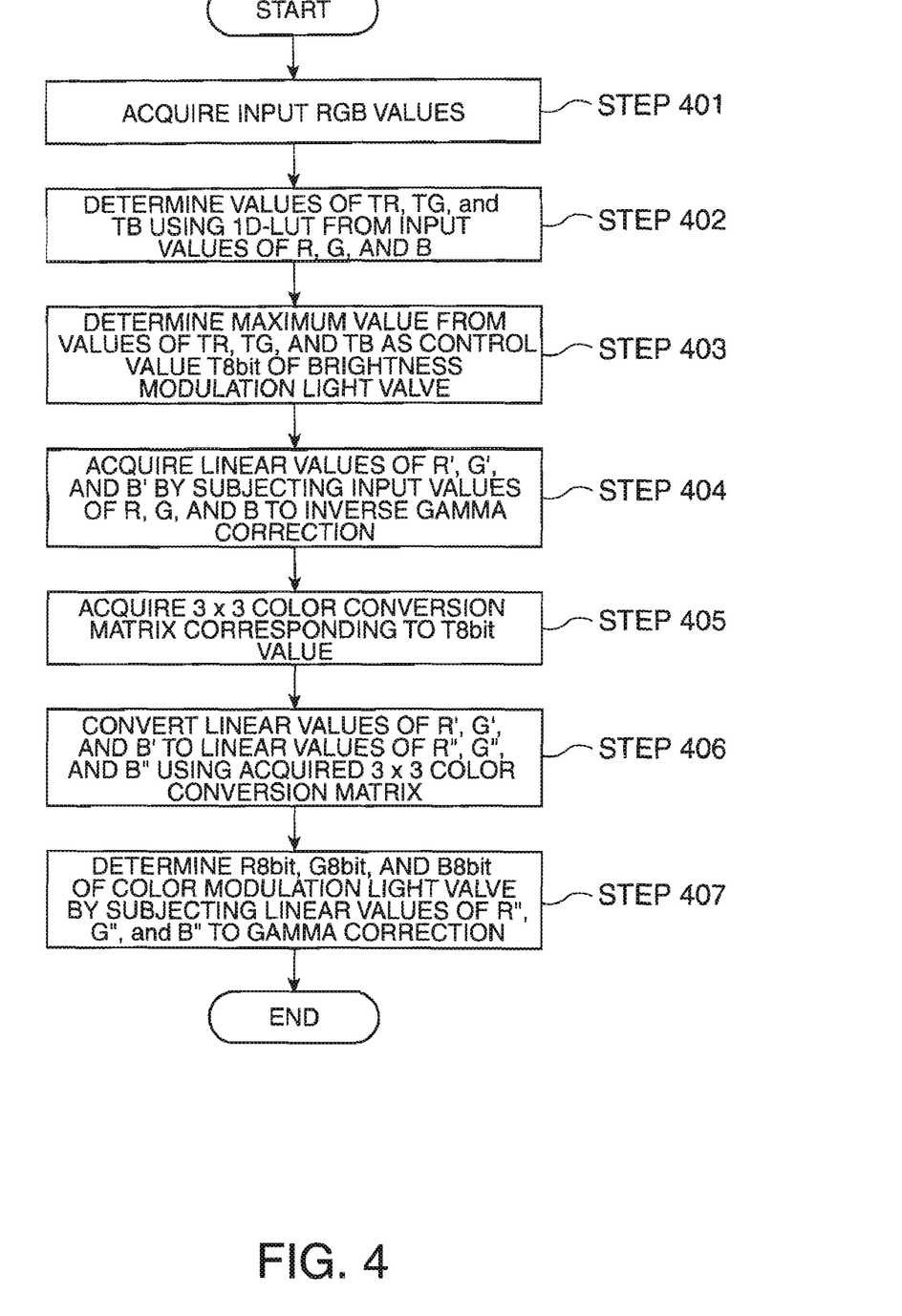
FIG. 4 is a flowchart of control application by the projector in the first embodiment.

Described next is the process procedure in the image processing device 30 by referring to the flowchart of FIG. 4.

First of all, input signals of R, G, and B provided by the input section 31 are acquired (step 401). The maximum value calculation/selection section 36 then determines the values of $T_R$, $T_G$, and $T_B$ from these input signals of R, G, and B (step 402), and the value being the maximum among these values of $T_R$, $T_G$, and $T_B$ is determined as a brightness control signal $T_{8bit}$ (step 403).

Thereafter, the inverse γ correction section 37 subjects the input signals of R, G, and B to inverse γ correction so that the input linear signals of R', G', and B' are acquired (step 404). The matrix computation/selection section 39 then selects the 3-by-3 matrix based on the brightness control signal $T_{8bit}$ (step 405), and calculates the output linear signals of R", G", and B" by multiplying the input linear signals of R', G', and B' by the selected 3-by-3 matrix (step 406). The γ correction section 40 then subjects the output linear signals of R", G", and B" to γ correction, and calculates the color control signals of $R_{8bit}$, $G_{8bit}$, and $B_{8bit}$ (step 407).

In such a manner, control is exercised over the color modulation light valves 22, 23, and 24, and the brightness modulation light valve 25.

According to this embodiment, the light transmissive prism 28 passing therethrough the light from the relay optical system 27 is disposed between the relay optical system 27 and the brightness modulation light valve 25 in such a manner that the optical path conditions from the color modulation light valves 22, 23, and 24 to the relay optical system 27 are made substantially the same as the optical path conditions from the relay optical system 27 to the brightness modulation light valve 25. Because the optical path conditions can be substantially the same between the sides of the relay optical system 27 as such, there is no more need to use lenses, e.g., aspheric lenses, requiring a high level of design technique so that the designing of the relay optical system 27 can be made with ease. This favorably reduces the cost taken to design the relay optical system 27. What is more, the easier design procedure hardly causes problems of highly-visible chromatic aberration, the lower image-forming performance capabilities, and others so that the relay optical system 27 can be increased in performance capability. With better performance capabilities as such, the image display device becomes able to contribute to increase the contrast and the dynamic range of displaying images.

Second Embodiment

Described next is a second embodiment of the invention. Similarly to the first embodiment, in the accompanying drawings, the scaling is appropriately changed to show the components with size good for perception. In the second embodiment, the light transmissive prism has the different configuration from that in the first embodiment, and thus is mainly described below.

Figure 5:
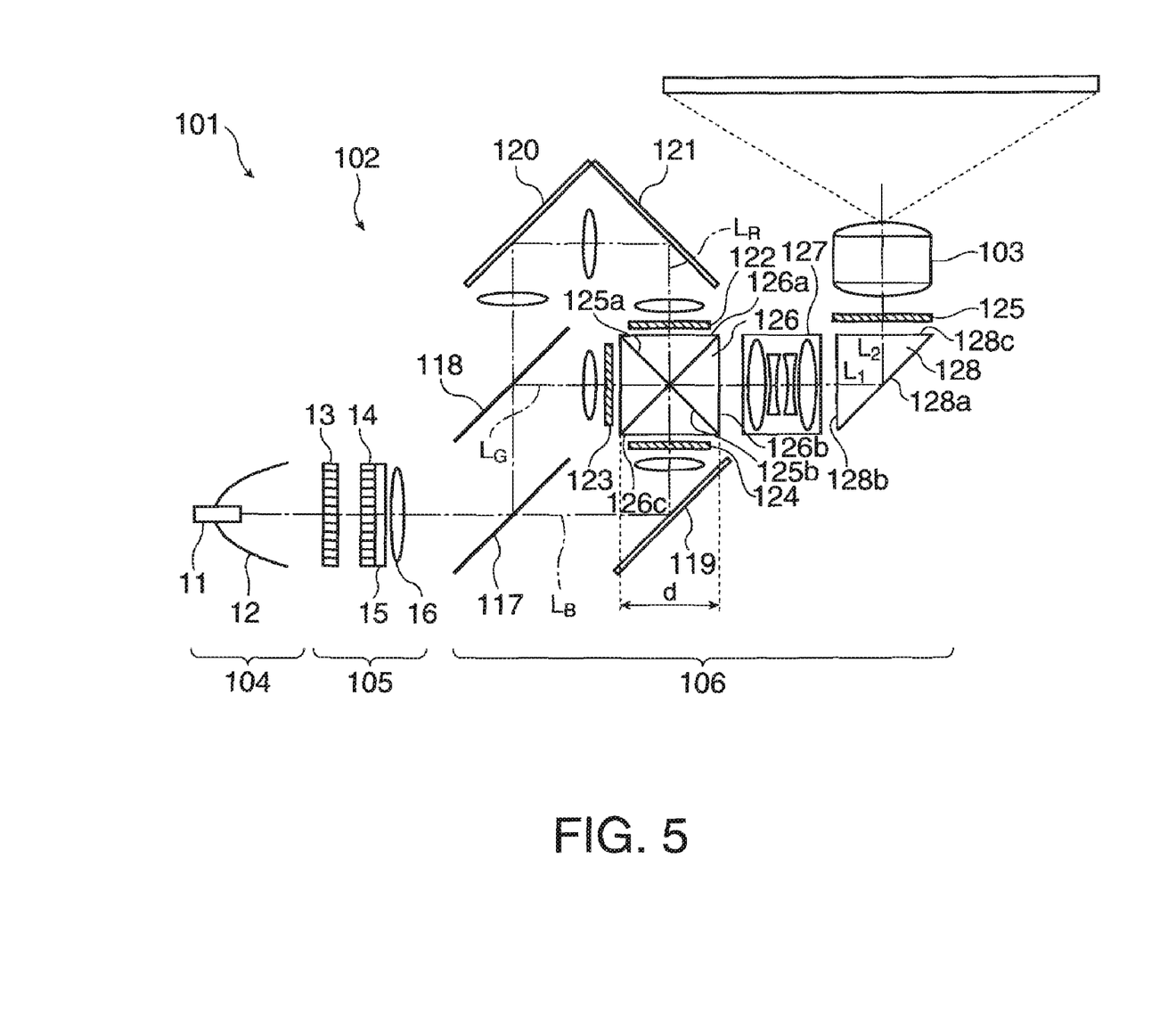
FIG. 5 is a diagram showing the configuration of a projector in a second embodiment of the invention.

FIG. 5 is a schematic diagram showing the internal configuration of a projector 101 serving as a projector.

The projector 101 is a three-panel intermittent-display color liquid crystal projector that includes a light-transmissive liquid crystal light valve each for colors of R (red), G (green), and B (blue), for example. The projector 101 is mainly configured by an image display device 102, and a projection lens 103.

The image display device 102 includes, broadly, a light source section 104, a uniform illumination section 105, and a color modulation section 106. The light source section 104 and the uniform illumination section 105 are configured similarly to the light source section 4 and the uniform illumination section, respectively, 5 in the first embodiment, and thus are not described here again.

The color modulation section 106 is mainly configured by dichroic mirrors 117 and 118, reflector mirrors 119, 120, and 121, liquid crystal light valves 122, 123, 124, and 125, a dichroic prism 126, a relay optical system 127, and a triangular prism 128. Similarly to the first embodiment, the dichroic prism 126 is a cubic optical member configured by attaching together four right-angle prisms, which are each made of a transparent material exemplified by glass, resin, or the like. Inside of the dichroic prism 126, dielectric multilayers 125a and 125b are formed in the shape of a cross to orthogonally intersect each other at the center of the dichroic prism 126. The dielectric multilayer 125a reflects the red light $L_R$, and the dielectric multilayer 125b reflects the blue light $L_B$.

Similarly to the first embodiment, the red light $L_R$ passing through the dichroic prism 126 has the optical path whose length is the sum of a length $d_1$ from a light incident-side surface 126a to the dielectric multilayer 125a and a length $d_2$ from the dielectric multilayer 125a to a light exiting-side surface 126b. This sum is equal to the length d of one side of the dichroic prism 126. The blue light $L_B$ passing through the dichroic prism 126 has the optical path whose length is the sum of a length $d_3$ from a light incident-side surface 126c to the dielectric multilayer 125b and the length $d_2$ from the dielectric multilayer 125b to the light exiting-side surface 126b. This sum is also equal to the length d of one side of the dichroic prism 126.

In this embodiment, the triangular prism 128 is used as the light transmissive member. When viewed from the above (state of FIG. 5), the triangular prism 128 is in the shape of an isosceles triangle, and a surface 128a corresponding to the hypotenuse serves as a reflector surface. A light incident-side surface 128b receiving the combined light is directly facing the relay optical system 127, and a light exiting-side surface 128c is directly facing the liquid crystal light valve 125.

The triangular prism 128 is made of the same material as the dichroic prism 126, e.g., a transparent material such as glass or resin. In the triangular prism 128, the reflector surface 128a reflecting thereon the light coming from the relay lens 127 bends the optical axis. Accordingly, the length in the optical axis direction will be the sum of optical path lengths $L_1$ and $L_2$. The optical path length $L_1$ is from the light incident-side surface 128b of the triangular prism 128 to the reflector surface 128a thereof, and the optical path length $L_2$ is from the reflector surface 128a to the light exiting-side surface 128c. The sum of the optical path length $L_1$ from the light incident-side surface 128b to the reflector surface 128a and the optical path length $L_2$ from the reflector surface 128a to the light exiting-side surface 128c is equal to the length d of one side of the dichroic prism 126.

According to the second embodiment, the triangular prism 128 is provided with the reflector surface 128a for reflecting thereon the light coming from the relay optical system 127 so that the optical path of the light can be bent. This enables to reduce the size of the optical system, thereby favorably leading to the smaller-sized image display device 102.

Third Embodiment

Described next is a third embodiment of the invention. Similarly to the first embodiment, in the accompanying drawings, the scaling is appropriately changed to show the components with size good for perception. In the third embodiment, the light transmissive prism has the different configuration from that in the first embodiment, and thus is mainly described below.

Figure 6:
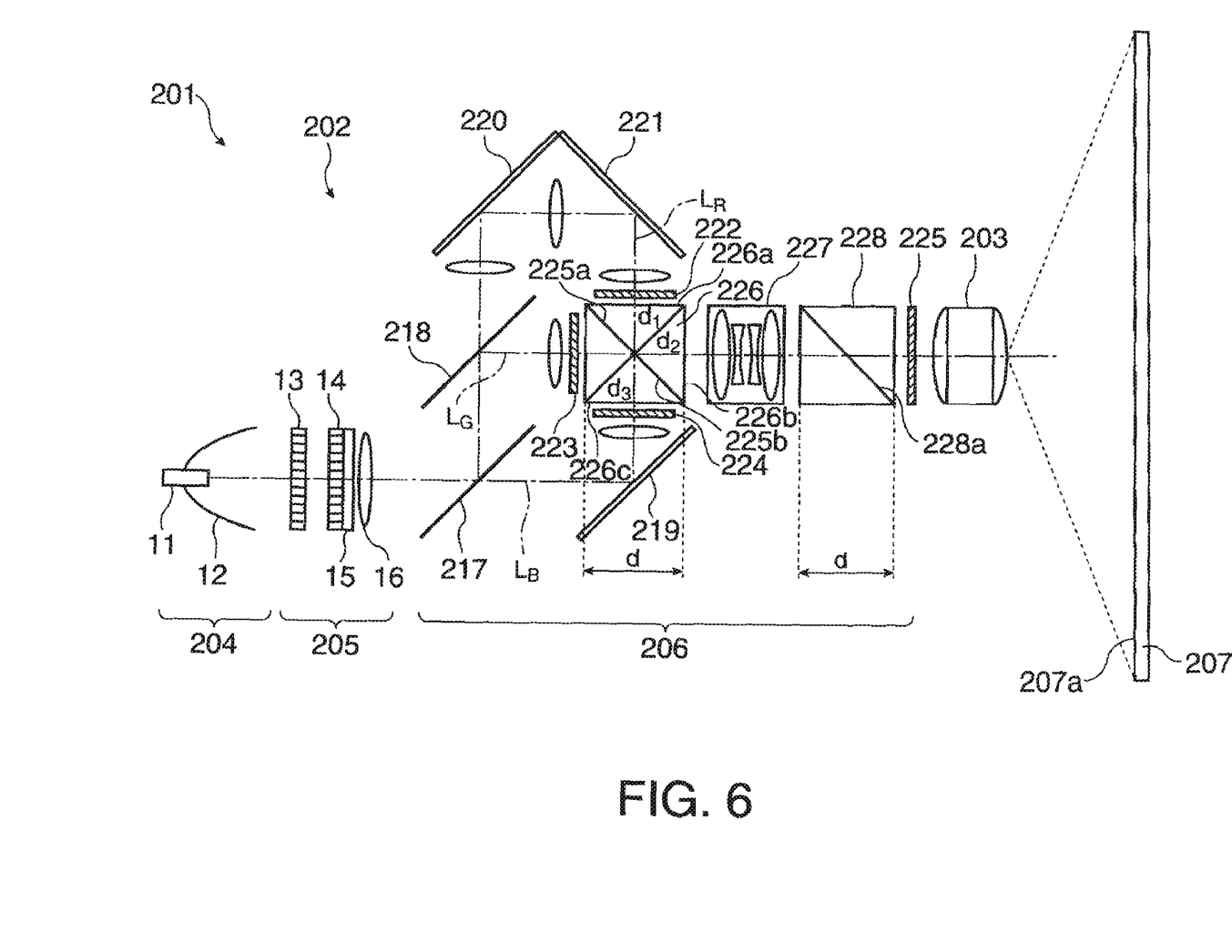
FIG. 6 is a diagram showing the configuration of the projector in a third embodiment of the invention.

FIG. 6 is a schematic diagram showing the internal configuration of a projector 201 serving as a projector.

The projector 201 is a three-panel intermittent-display color liquid crystal projector that includes a light-transmissive liquid crystal light valve each for colors of R (red), G (green), and B (blue), for example. The projector 201 is mainly configured by an image display device 202, and a projection lens 203.

The image display device 202 includes, broadly, a light source section 204, a uniform illumination section 205, and a color modulation section 206. The light source section 204 and the uniform illumination section 205 are configured similarly to the light source section 4 and the uniform illumination section 5, respectively, in the first embodiment and thus are not described here again.

The color modulation section 206 is mainly configured by dichroic mirrors 217 and 218, reflector mirrors 219, 220, and 221, liquid crystal light valves 222, 223, 224, and 225, a dichroic prism 226, a relay optical system 227, and a polarizer beam splitter 228. Similarly to the first embodiment, the dichroic prism 226 is a cubic optical member configured by attaching together four right-angle prisms, which are each made of a transparent material exemplified by glass, resin, or the like. Inside of the dichroic prism 226, dielectric multilayers 225a and 225b are formed in the shape of a cross to orthogonally intersect each other at the center of the dichroic prism 226. The dielectric multilayer 225a reflects the red light $L_R$, and the dielectric multilayer 225b reflects the blue light $L_B$.

Similarly to the first embodiment, the red light $L_R$ passing through the dichroic prism 226 has the optical path whose length is the sum of a length $d_1$ from a light incident-side surface 226a to the dielectric multilayer 225a and a length $d_2$ from the dielectric multilayer 225a to a light exiting-side surface 226b. This sum is equal to the length d of one side of the dichroic prism 226. The blue light $L_B$ passing through the dichroic prism 226 has the optical path whose length is the sum of a length $d_3$ from a light incident-side surface 226c to the dielectric multilayer 225b and the length $d_2$ from the dielectric multilayer 225b to the light exiting-side surface 226b. This sum is also equal to the length d of one side of the dichroic prism 226.

In this embodiment, the light transmissive member is the polarizer beam splitter (PBS) 228 including a polarizer separation layer 228a on the optical path. The PBS 228 is a prism whose dimension (length) d in the optical axis direction is the same as the dimension (length) d of the dichroic prism 226 in the optical axis direction. The PBS 228 passes therethrough the combined light guided by the relay optical system 227. The PBS 228 is made of a material same as that for the dichroic prism 226, e.g., transparent material such as glass or resin. Accordingly, the dichroic prism 226 and the PBS 228 share the same refractive index and the optical path length therein.

In the third embodiment, the PBS 228 is provided as the light transmissive member so that the optical path conditions from the liquid crystal light valves 222, 223, and 224 to the relay optical system 227 can be substantially the same as the optical path conditions from the relay optical system 227 to the liquid crystal light valve 225. At the same time, the light incident side of the liquid crystal light valve 225 can serve as the polarizer plate.

The PBS 228 is high in light transmission efficiency compared with the polarizer plate, and thus projection images to be projected on a projection surface 207a of a screen 207 will be brighter than with a normal polarizer plate provided on the light incident side of the liquid crystal light valve 225. By the PBS 228, effects of the heat dissipation can be also increased against the heat generation as a result of light absorption.

The technical scope of the invention is not surely restrictive to the embodiments described above, and it is understood that numerous other modifications and variations can be appropriately devised without departing from the scope of the invention.

For example, in the configuration of the first embodiment, the light transmissive prism 28 is attached with the polarizer plate 28a. This is surely not restrictive, and alternatively, the configuration may include a low-pass filter that reduces the bandwidth of a light coming from the relay optical system 27, or any other optical components such as wave plate.

If with a low-pass filter, the combined light can be adjusted in brightness. For example, when the combined light is adjusted to reduce the brightness, the combined light can be advantageously increased in color purity compared with the case of uniformly reducing the brightness in the entire wavelength. What is more, with the configuration that the light transmissive prism 28 is attached with the low-pass filter, there is no more need to include the low-pass filter as an individual component so that the image display device 102 can be saved in space. With such space saving, the image display device 102 can be accordingly reduced in size. Moreover, this is similarly applicable to the case of attaching a wave plate, and eliminates the need to include the wave plate as an individual component. This leads to the space saving so that the image display device 102 can be accordingly reduced in size.

In the second embodiment, the triangular prism 128 is used for the purpose of bending the optical path. This is surely not restrictive, and a reflector surface may be formed inside of the light transmissive prism 128 in the first embodiment, e.g., at the position overlapping the diagonal line when viewed from the above. This accordingly widens the design options for the optical system.

In the above embodiments, exemplified as a light source is the lamp 11 ejecting white lights. This is surely not restrictive, and a possible light source may separately elect red lights, green lights, and blue lights, e.g., LED (Light-Emitting Diode) or others being a solid-state light source. With this being the case, the dichroic mirrors 17 and 18 can be omitted.

In the above embodiments, exemplified is the case that the optical modulator is the light-transmissive liquid crystal light valve. This is surely not restrictive, and a possible option is a reflective liquid crystal light valve. The invention is surely applicable if with an optical modulator such as micromirror array device.

In the above embodiments, exemplified is the case that the liquid crystal light valves 22, 23, 24, and 25 are all of the same dimension, e.g., about 4.6 square centimeters (about 0.7 square inches), and have the same number of pixels, pixel arrangement, and pixel pitch. This is surely not the only option, and the invention can be applicable to a case where the liquid crystal light valves do not have the same dimension, the number of pixels, the pixel arrangement, and the pixel pitch.

The entire disclosure of Japanese Patent Application No. 2005-324580, filed Nov. 9, 2006 is expressly incorporated by reference herein.

What is claimed is:

1. An image display device, comprising:
a light source;
a first transmissive optical modulator that modulates a plurality of color lights coming from the light source;
a color combination member that combines the color lights provided by the first optical modulator;
a second transmissive optical modulator that modulates a light provided by the color combination member as a result of the color light combination;
a relay optical system that is disposed between the color combination member and the second optical modulator, and guides the light provided by the color combination member to the second optical modulator; and
a light transmissive member that is disposed between the relay optical system and the second optical modulator, and has a function of allowing optical path conditions from the first optical modulator to the relay optical system via the color combination member to be substantially the same as optical path conditions from the relay optical system to the second optical modulator, the light transmissive member being made of a material which is the same as that for the color combination member and is a light transmissive prism whose dimension in an optical axis direction is substantially the same as a dimension of the color combination member in the optical axis direction.

2. The image display device according to claim 1, wherein the light transmissive member is provided with a reflector surface that reflects the light from the relay optical system.

3. The image display device according to claim 1, wherein a distance from the color combination member to the relay optical system is made substantially the same as a distance from the relay optical system to the light transmissive member.

4. The image display device according to claim 1, wherein the light transmissive member is provided with a polarizer plate.

5. The image display device according to claim 1, wherein the light transmissive member is provided with a polarizer separation section.

6. The image display device according to claim 1, wherein the light transmissive member is provided with an optical filter that reduces a bandwidth of the light.

7. The image display device according to claim 1, wherein the light transmissive member is provided with a wave plate.

8. A projector including the image display device of claim 1.

9. An image display device, comprising:
a light source;
a first transmissive optical modulator that modulates a plurality of color lights coming from the light source;
a color combination member that combines the color lights provided by the first optical modulator;
a second transmissive optical modulator that modulates a light provided by the color combination member as a result of the color light combination;
a relay optical system that is disposed between the color combination member and the second optical modulator, and guides the light provided by the color combination member to the second optical modulator, the relay optical system being telecentric on both sides; and
a light transmissive member that is disposed between the relay optical system and the second optical modulator, and has a function of allowing optical path conditions from the first optical modulator to the relay optical system via the color combination member to be substantially the same as optical path conditions from the relay optical system to the second optical modulator, wherein
a distance from the color combination member to the relay optical system is made substantially the same as a distance from the relay optical system to the light transmissive member.

10. The image display device according to claim 9, wherein the light transmissive member is made of a material which is the same as that for the color combination member, and
the light transmissive member is a light transmissive prism whose dimension in an optical axis direction is substantially the same as a dimension of the color combination member in the optical axis direction.

11. The image display device according to claim 9, wherein the light transmissive member is provided with a reflector surface that reflects the light from the relay optical system.

12. The image display device according to claim 9, wherein the light transmissive member is provided with a polarizer plate.

13. The image display device according to claim 9, wherein the light transmissive member is provided with a polarizer separation section.

14. The image display device according to claim 9, wherein the light transmissive member is provided with an optical filter that reduces a bandwidth of the light.

15. The image display device according to claim 9, wherein the light transmissive member is provided with a wave plate.

16. A projector including the image display device of claim 9.

* * * * *